United States Patent [19]

Lindström

[11] Patent Number: 5,234,271
[45] Date of Patent: Aug. 10, 1993

[54] SHAFT BEARING, ESPECIALLY A WHEEL SHAFT BEARING IN A MOTOR VEHICLE

[75] Inventor: Stig Lindström, Nödinge, Sweden

[73] Assignee: AB Volvo, a Swedish Body Corporate, Gothenburg, Sweden

[21] Appl. No.: 893,080

[22] Filed: Jun. 3, 1992

[30] Foreign Application Priority Data

Jun. 5, 1991 [SE] Sweden ............................ 9101706-1

[51] Int. Cl.⁵ ............................................. F16C 19/04
[52] U.S. Cl. ..................................... 384/510; 384/434; 384/537
[58] Field of Search ............... 384/510, 537, 584, 559, 384/434, 559

[56] References Cited

U.S. PATENT DOCUMENTS

| | | | |
|---|---|---|---|
| 2,872,253 | 2/1959 | Foote et al. | 384/434 |
| 3,300,256 | 1/1967 | Liebig | 384/434 |
| 4,199,202 | 4/1980 | Maeda | 384/434 |
| 4,571,098 | 2/1986 | Rudnik | 384/537 |

*Primary Examiner*—Lenard A. Footland
*Attorney, Agent, or Firm*—Burns, Doane, Swecker & Mathis

[57] ABSTRACT

A bearing housing for a drive shaft of a front-wheel vehicle comprises a bearing housing composed of a bearing bracket and a bearing cap. The bearing bracket is provided with a first peripheral flange only on one axial side thereof so that the bearing can be inserted in one axial direction until it abuts the flange. The bearing cap has a corresponding second peripheral flange on at least the opposite axial side so that the bearing is completely fixed in both axial directions when the cap is mounted to the bracket.

4 Claims, 2 Drawing Sheets

SHAFT BEARING, ESPECIALLY A WHEEL SHAFT BEARING IN A MOTOR VEHICLE

BACKGROUND OF THE INVENTION

1. Field of the Invention

The present invention relates in general to a shaft bearing, especially a wheel shaft bearing in a motor vehicle, comprising a rolling bearing with an inner bearing ring which is axially fixed on a shaft, and an outer bearing ring which is radially fixed in a bearing housing comprising a bearing bracket and a bearing cap.

In particular the invention relates to such a shaft bearing for intermediate support of a wheel drive shaft in a vehicle, said shaft having a splined end to be inserted into an element with corresponding splines in the vehicle differential.

In front-wheel drive vehicles with a transverse engine, the gear box with the associated vehicle differential is always laterally displaced from the longitudinal center plane of the vehicle, and this means that the drive shafts between the differential and the front wheels must have different lengths. In order to prevent unevenness during rapid acceleration due to the different lengths of the shafts, resulting in different deflections of the shafts, it is known in the art to support the longer shaft with an intermediate bearing, so that the free length of the shaft outside the bearing will be equal to the length of the shorter shaft.

In previously known shaft bearings of the type described by way of introduction, the bearing housing is primarily designed to radially fix the shaft and the bearing. The shaft is fixed axially with the aid of a lockring on the gear engaging the shaft. After the splined end of the shaft is inserted into a corresponding splined opening in the gear during assembly, the lockring is snapped into a groove on the shaft in order to fix it axially. At the same time as the end of the shaft is inserted into the gear in a differential, the bearing fixed on the shaft is inserted axially into the bearing housing, and the inner locking of the shaft with the aid of the lockring thus results in the bearing being fixed axially in the bearing housing. This axial locking with the air of a lockring makes mounting and possible later removal of the shaft relatively complicated. A heavy axial load may even involve the risk of the lockring being forced out of its groove.

In general, the purpose of the present invention is to provide a shaft bearing which facilitates mounting of the shaft by eliminating the need for extra elements, such as a lockring or the like, for connecting the shaft to the drive means while at the same time retaining the possibility of inserting the shaft and the bearing axially to their final assembly positions. In particular it is intended to provide such a shaft bearing for intermediate support of a wheel drive shaft.

SUMMARY OF THE INVENTION

This is achieved according to the invention by virtue of the fact that the bearing support surface of the bearing bracket has, on one side, a first peripheral flange forming an axial abutment for the bearing outer ring, but lacking a corresponding axial abutment on its opposite side in order to permit axial insertion of the bearing into the bearing bracket. The bearing cap has, on at least its axial side opposite the first peripheral flange of the bearing bracket, a corresponding second peripheral flange forming an axial abutment for axially fixing the bearing together with the first mentioned peripheral flange of the bearing bracket.

Additionally, the invention utilizes the bearing housing for axially fixing the bearing and thus the shaft, such that the shaft end of a vehicle drive shaft need not be locked in the differential. By providing the first peripheral flange in the bearing bracket on the side closest to the differential, assembly is done simply by inserting the shaft into the differential until the bearing outer ring abuts against the first peripheral flange, whereafter the bearing cap is mounted in place, so that its oppositely disposed second peripheral flange locks the bearing axially in the opposite direction. Removal of the shaft is, in a corresponding manner, quite simple.

BRIEF DESCRIPTION OF THE DRAWINGS

The invention will be described in more detail with reference to a preferred example shown in the accompanying drawing, where.

DETAILED DESCRIPTION OF A PREFERRED EMBODIMENT OF THE INVENTION

Figure 3:
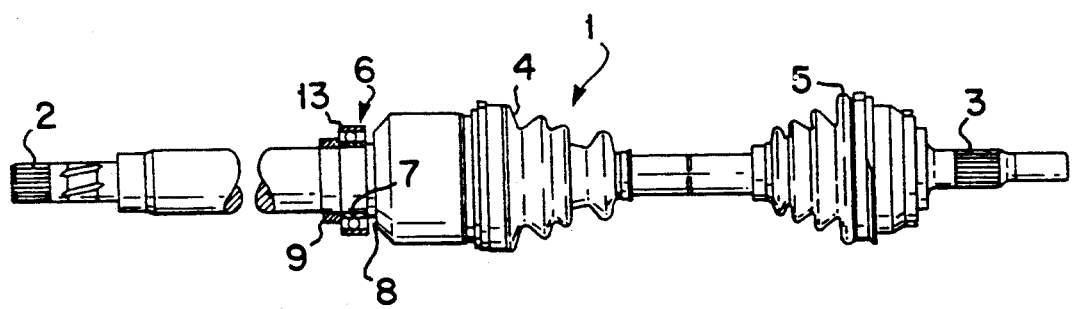
FIG. 3 shows a plan-view of wheel drive shaft in a front-wheel drive vehicle.
Figure 4:
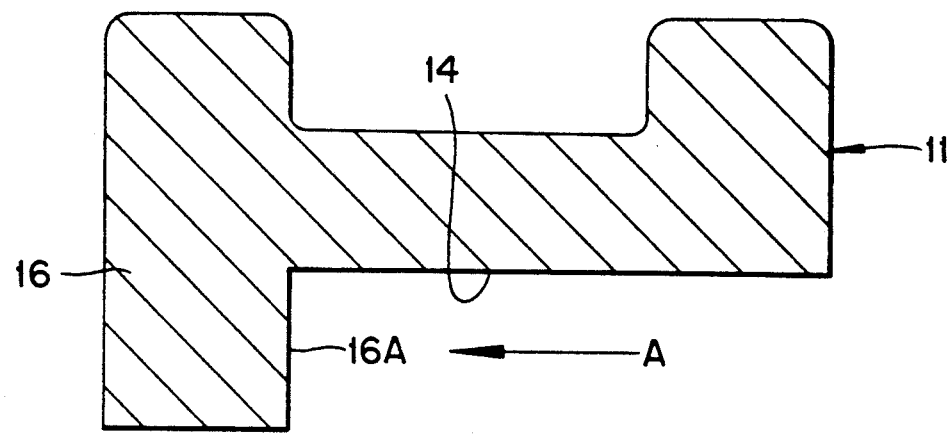
FIG. 4 shows a cross-section of the bearing housing taken along line 4—4 in FIG. 1.

FIG. 3 shows a complete drive shaft 1 for a front-wheel drive vehicle with a transverse engine. The shaft 1 has an inner splined end for engaging a differential gear with corresponding splines (not shown) in the vehicle differential. The outer end of the shaft 1 is provided with splines 3 and is designed to engage a wheel hub (not shown). Between the shaft ends, the shaft has a pair of universal joints (drive joints) 4 and 5 and a ball bearing 6, which is a combined thrust and radial bearing. An inner ring or race 7 of the bearing 6 is fixed axially between a flange 8 on the shaft 1 and a shrink ring 9.

The purpose of the ball bearing 6 is to compensate for the difference in deflection caused by the difference in length, which occurs between the left and right drive shafts in front-wheel drive vehicles with transverse engines. The ball bearing 6 is mounted in a bearing housing 10, shown in FIG. 1, which is screwed securely to the engine (now shown), so that there is no relative movement between the engine and the bearing when the engine moves resiliently in its suspension.

Figure 1:
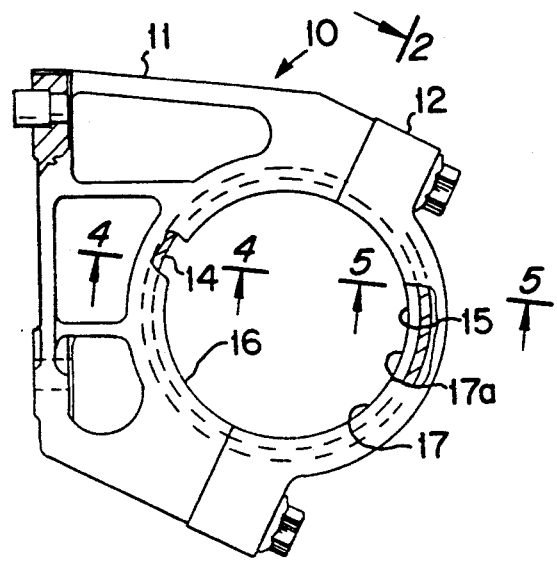
FIG. 1 shows a side-view of a complete bearing housing.
Figure 2:
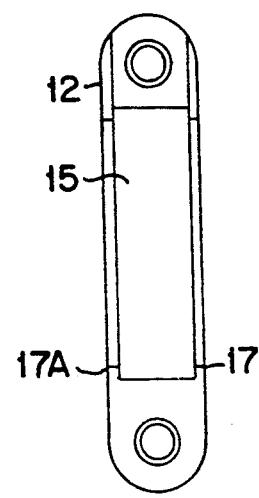
FIG. 2 shows a plan-view from below the bearing housing cap taken along the line 2—2 in FIG. 1.
Figure 5:
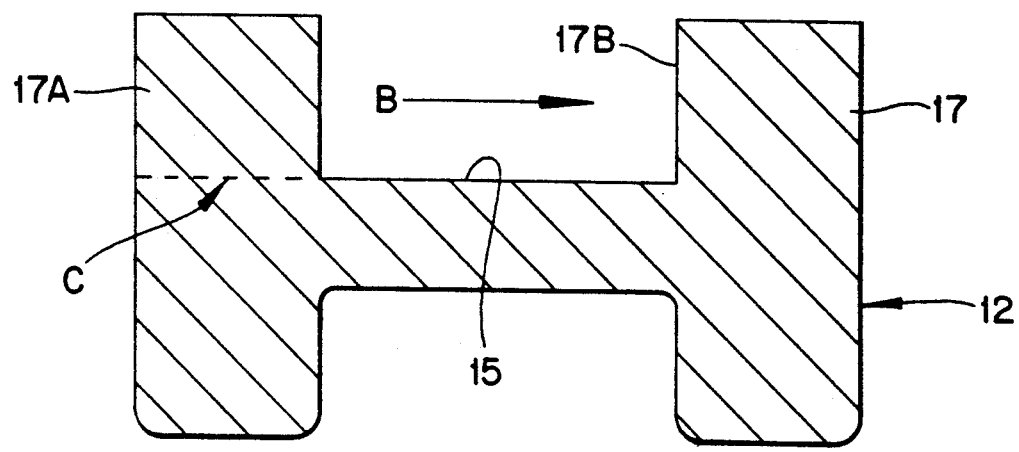
FIG. 5 shows a cross-section of the bearing housing cap taken along line 5—5 in FIG. 1.

The bearing housing 10 is shown separately in FIG. 1 and comprises a bearing bracket 11 and a cap 12, each provided with bearing support surfaces 14 and 15 respectively for an outer ring or race 13 of the bearing 6. The supporting surface 14 of the bearing bracket 11 is bounded on one side by a first peripheral flange 16 forming an axial abutment surface 16A for the outer ring 13 of the bearing. The cap 12 is provided on either side of its supporting surface 14 with corresponding second and third flanges 17 and 17A as is shown most clearly in FIGS. 1, 2 and 5.

The bearing bracket 11 is fixed relative to the engine, so that its first peripheral flange 16 lies on the side closest to the vehicle differential. For mounting the shaft 1, as shown in FIG. 3, the splined end 2 is inserted into the differential in a first axial direction. A until the outer ring of the bearing abuts against the surface 16A of the first peripheral flange 16, of the bearing bracket which determines the extent of insertion in the direction A. The bearing cap 12 is then screwed securely to the bearing bracket 11. The flange 17 of the bearing cap 12 includes an abutment surface 17B which prevents movement of the bearing in an opposite direction B, thus fixing the shaft axially in both directions A, B in the embodiment shown.

The cap is made with second and third peripheral flanges 17 and 17A, but in principal it would suffice with only the second peripheral flange 17 on the side opposite to the first peripheral flange 16 in order to lock the shaft in both directions when the bearing cap is mounted in place. That is, the cap 12 could be severed along line C shown in phantom.

By using the bearing housing 10 for axial fixing of the shaft and providing the bearing bracket with only a first peripheral flange 16, the mounting and removal of the shaft is made particularly simple.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A bearing apparatus for a shaft rotatable about an axis comprising:
   a bearing, and
   a bearing housing comprising:
      a bracket having on only one axial side thereof a first peripheral flange forming a first axial abutment surface for an outer bearing ring, permitting axial insertion of the bearing into said housing in a first axial direction, and
      a bearing housing cap attachable to said bracket in a direction transversely to said axis, said bearing housing cap having on its axial side opposite said first peripheral flange a second peripheral flange forming a second abutment surface for axially fixing said bearing in a second axial direction opposite said first axial direction.

2. The bearing apparatus of claim 1, wherein said first peripheral flange and said second peripheral flange extend along an entire side of the bracket and cap, respectively.

3. The bearing apparatus of claim 1, wherein said bearing cap has a third peripheral flange disposed radially opposite said first peripheral flange for axially fixing said bearing in said first axial direction.

4. A vehicle shaft apparatus comprising:
   a shaft,
   a bearing mounted on said shaft,
   a bearing housing comprising:
      a bracket having on only one axial side thereof a first peripheral flange forming a first axial abutment surface for an outer bearing ring, permitting axial insertion of the bearing into said housing in a first axial direction, and
      a bearing housing cap attachable to said bracket in a direction transversely to said axis, said bearing housing cap having on its axial side opposite said first peripheral flange, a second peripheral flange forming a second abutment surface for axially fixing said bearing in a second axial direction opposite said first direction,
   said bearing cap having a third peripheral flange disposed radially opposite said first peripheral flange for axially fixing said bearing in said first axial direction,
   said first peripheral flange and said second peripheral flange extending along an entire side of the bearing bracket and the bearing cap, respectively,
   said shaft having a splined end for insertion into an element with an opening having corresponding splines, wherein said bearing housing is fixed relative to said element such that said first peripheral flange forms an axial abutment limiting movement of said shaft.

* * * * *